May 14, 1968  R. V. COBB ETAL  3,383,515
DUAL BEAM NULL METHOD AND APPARATUS FOR DETERMINING
THE CONCENTRATION OF IMPURITIES IN A SAMPLE
Filed Aug. 21, 1964  2 Sheets-Sheet 1

INVENTORS
Robert V. Cobb
Earl E. Coulter
William T. Hage
James K. Rice
BY *J. P. Moran*
ATTORNEY

United States Patent Office 3,383,515
Patented May 14, 1968

3,383,515
DUAL BEAM NULL METHOD AND APPARATUS FOR DETERMINING THE CONCENTRATION OF IMPURITIES IN A SAMPLE
Robert V. Cobb, Sebring, Earl E. Coulter, Akron, and William T. Hage, Alliance, Ohio, and James K. Rice, Pittsburgh, Pa., assignors to The Babcock & Wilcox Company, New York, N.Y., a corporation of New Jersey
Filed Aug. 21, 1964, Ser. No. 391,161
15 Claims. (Cl. 250—218)

ABSTRACT OF THE DISCLOSURE

This invention is a method and device for determining the concentration of an element in a sample. The sample is introduced into an ionizing heat source from which light characteristic of the element is emitted. A standard light value also emitted from the heat source is compared with the characteristic light to determine the difference therebetween. The comparison is made by generating an electrical signal which is a function of the difference between light intensities and using it to attenuate the characteristic light with respect to the standard, and to visually indicate the concentration of the element in the sample. The structure includes sampling apparatus for continuously aspirating discrete amounts of sample to a flame enclosed in a housing having a reflective surface for concentration of light and heat therein. Stationary and rotatable polarizing materials, disposed in the path of light emitted from the housing, cooperate to eliminate the difference in intensity between the standard and characteristic light beams. The light beams are filtered from the heat source and polarized for impingement on a detecting means. The detecting means produces an unbalanced electrical signal representative of the difference in intensity between beams for operating a device for indicating the concentration of the element in the sample, and rotating a polarizer to eliminate the difference in intensity between beams.

---

The present invention relates generally to an improved light intensity measuring system, and more particularly to a light intensity measuring device and method to be used in the determination of impurities in feed water being fed into, or steam being produced by a steam generator or boiler.

In the operation of vapor generating equipment where the vapor or steam is being produced at conditions of high temperature, i.e., high superheat and pressure, it is necessary to maintain the impurities in the steam at a sufficiently low level to avoid the deleterious deposition of these impurities on metallic surfaces with which the steam comes into contact. For example, in a large electric generating station having a steam driven turbine as the prime mover for the electric generator, it is desirable that the impurities in the steam being supplied to the turbine from the boiler be minimized in order to prevent the deposition of these impurities on the turbine blades and thereby avoid the inefficient operation of the turbine and possible unbalance of the turbine rotating element which would otherwise occur. In order to be able to control the impurities in the steam, it is, of course, necessary to monitor the impurity level in the boiler, either in terms of feed water impurities or preferably more directly in terms of steam impurities. Although this monitoring may be accomplished on an intermittent basis, it is obviously advantageous that it be done continuously so that any adverse change in steam purity may be quickly detected, and the necessary remedial steps taken.

Until recently, the electrical conductivity method was the accepted technique for determining the impurity content of boiler feed water and/or steam. This method is reliable for measuring steam impurities down to about 0.5 part per million. With the advent of the use of higher levels of superheat and operating pressures and the associated refinements in the equipment with which the highly superheated steam came into contact, the already stringent steam purity requirements increased sharply, going beyond the range of capability of the electrical conductivity method of analysis. Today, in order to effectively monitor steam purity, the analysis equipment must be capable of detecting impurities in terms of fractional parts per billion. More recently, flame photometers have been successfully developed for use in determining these extremely low level boiler water and steam impurity concentrations. Flame photometry is defined as the determination of the concentration of a chemical element by heating it to a sufficiently high temperature to excite the atoms of the element to cause it to emit light at its characteristic wave lengths and measuring the intensity of light produced by the element at one of its characteristic wave lengths. Flame photometers utilize the following steps in measuring the amount of a specific element in a sample: first, the atoms of the element are excited to cause them to emit light of their predominant characteristic wave length in proportion to the concentration of the element in the sample; second, a spectrally pure beam of the specific wave length of the element is isolated from the emission; and finally, the intensity of this beam is measured, the beam intensity being proportional to the concentration of the element in the sample being tested.

The flame photometer has been found to be especially adapted for the determination of minute quantities of sodium in a sample, for the reason that the element sodium has a particularly intense characteristic wave length. It has been found that the flame photometer can detect the concentration of the element sodium in a sample when the concentration of the sodium is in the range of fractional parts per billion. Moreover, sodium is present in nearly all boiler waters, and since its concentration in boiler water consists, without significant variance, of about one third of the total impurities in the water, the flame photometer can be used to determine the level of impurities in boiler water by way of sodium analysis. In addition to its greater sensitivity, this method of determining impurities is superior to the previously used electrical conductivity method in that it is not affected by gases in the steam, it is not affected by variations in the temperature of the sample, and the lag time between sample and result is significantly lower.

Although the capabilities of presently used flame photometers are adequate for determining minute quantities of steam impurities on an experimental or laboratory basis this equipment has been found to be totally unsuitable for adaptation as a portable field instrument or as a continually operating integrated element of an in-plant control system. In addition to being bulky and expensive, the presently used devices utilize optical systems and mechanical components which are extremely fragile and susceptible to damage due to shock or vibration. Moreover, these devices use electronic systems which are inherently unstable, subject to drift, and consequently require frequent calibration and virtually constant attention during their operation. An additional disadvantage of the flame photometers presently available for the purposes contemplated by the present invention, is that they are not capable of providing direct readings of sodium content, i.e., the reading from the meter must constantly be referred to a calibration curve in order to obtain the desired sodium concentration reading.

It is therefore an object of the present invention to provide a light sensing system for use as the main component of a flame photometer which may be used as a portable unit or as part of a system of installed operational instrumentation for the purpose of determining the sodium content of feed water or steam in a vapor generating unit. Further objects are that this improved flame photometer be characterized by a rugged optical system and mechanical components which are not vulnerable to shock or vibration. A further object is the provision of an internal reference light within the flame photometer so that a null-balance electronic system is effected whereby the output or reading is rendered independent of the inherent drift characteristics of the individual electronic system components. A still further object of the invention is to provide a relatively inexpensive compact flame photometer requiring a minimum of calibration and attention during continuous operation.

According to this invention, these and other objects are obtained in a flame photometer, a general description of which follows. The sample, containing a quantity of the element (usually sodium) to be measured is introduced into a heat source having a sufficiently high temperature and sufficient thermal inertia, viz, ability to maintain its temperature upon the injection of a sample thereinto, to effect excitation of the sample, whereby light is emitted from the heat source. A first interference filter isolates, from a portion of the light emitted from the heat source, a relatively spectrally pure beam having a wave length characteristic of sodium, and a second interference filter similarly isolates a relatively spectrally pure reference beam having a wave length close to but different than the sodium wave length. A light valve having a variable effective opening is provided for attenuating the intensity of the sodium beam. A photomultiplier tube is disposed in light receiving relationship to both beams, and a chopper is disposed in the path of the beams for alternately admitting the beams into the tube, whereby an A.C. electrical output signal is produced having an unbalance proportional to the difference in intensity between the sodium and the reference beams. A servo-mechanism is arranged to vary the effective opening of the light valve in response to the unbalance in the photomultiplier output signal and thereby alter the intensity of the sodium beam in a direction tending to eliminate the unbalance. With this arrangement a direct reading of the amount of sodium in the sample may be obtained from an indicator or recorder which is responsive to the amount of effective opening of the light valve.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Figure 1:
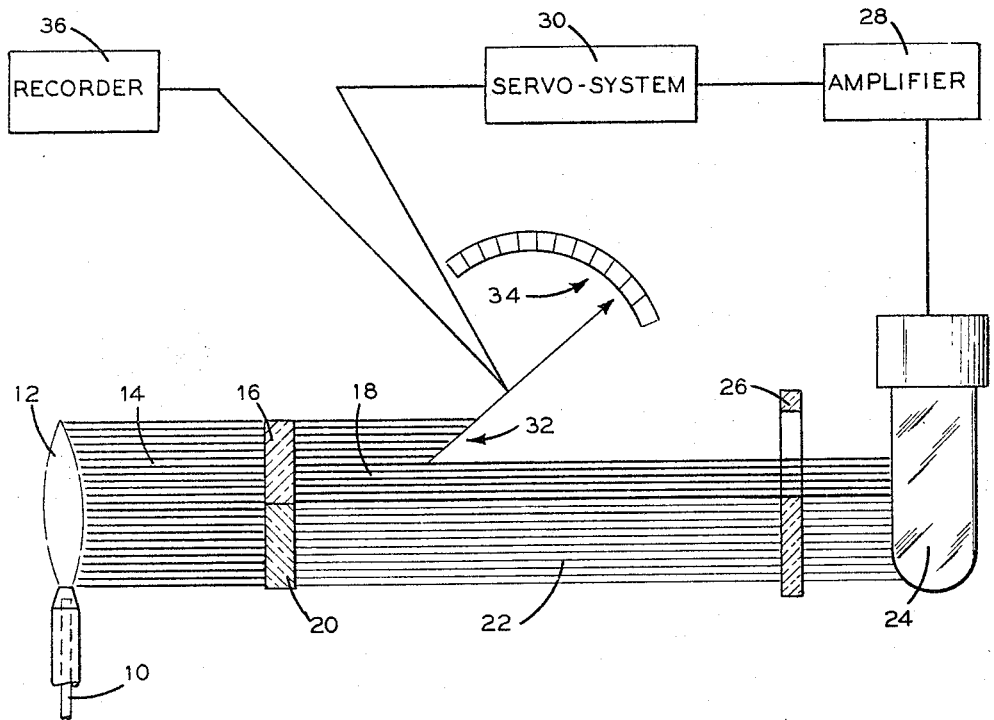
FIG. 1 is a schematic diagram of the basic components of the inventive flame photometer.

Referring to FIG. 1, the sample to be analyzed is continuously introduced through tube 10 into the high temperature heat source 12, which may be a hydrogen/oxygen flame, a plasma torch, an electrically augmented gaseous fuel flame or any other suitable source of heat having sufficiently high temperature and thermal inertia to effect substantial excitation of the atoms of the element (usually sodium) being analyzed in the sample. The high temperature of the heat source 12 causes excitation of the sample and consequently emission of light (indicated at 14) having a multiplicity of wave lengths.

The element filter 16 isolates from a portion of the light 14 a beam of relatively spectrally pure light (indicated at 18) having a wave length characteristic of the element being analyzed. For example, if the element sodium is being analyzed, the filter 16 would pass only that portion of the light having a wave length of approximately 589 millimicrons. The reference filter 20 similarly isolates from a portion of the light 14, a reference beam of relatively spectrally pure light (indicated at 22) having a characteristic wave length different than and preferably close to the wave length of the light beam 18, for example, when the element sodium is being analyzed, the preferable wave length for the reference beam 22 has been found to be about 570 millimicrons. The selection of the wave length of the reference light beam 22 will be discussed hereinafter in connection with the specific embodiments of the inventive flame photometer. At this time it is sufficient to say that the reference beam wave length is generally based on its purity and freedom from interference of other elements normally found in samples of the type being analyzed. It should be recognized that the intensity of the reference beam 22 which is passed through filter 20 remains constant, while the intensity of the light beam 18 which is passed through element filter 16 and represents the element being analyzed is variable depending on the amount of the element in the sample.

A photo-sensitive detector 24 is disposed in light receiving relationship to the beams 18 and 22, and an interrupter 26 is arranged to alternately admit the beams 18 and 22 into the photo-sensitive detector 24 at a controlled predetermined frequency. The photo-sensitive detector 24 converts the photons of the light beams 18 and 22 into electrons to thereby produce an electrical signal which is amplified in the amplifier 28. Any unbalance in the electrical signal due to the inequality of the intensities of the beams 18 and 22 causes the servo-system 30 to adjust the light valve (shown schematically at 32) so as to effect a change in the intensity of the beam 18 tending to render its intensity at the photo-sensitive detector equal to that of the reference beam 22. The indicator 34 and recorder 36, responsive to the effective opening of the light valve 32, are arranged to provide a visual indication and record of the concentration of the element being analyzed in the sample.

Thus, after appropriate calibration of the flame photometer with standardized samples of known quality, an increase in the concentration of the element being analyzed in the sample injected into the heat source 12 will produce an increase in the intensity of the beam 18 passing through the element filter 16. Since the intensity of the reference beam 22 is constant, this will cause an unbalance in the intensities of the beams 18 and 22, and consequently an unbalance in the electrical output signal from the photo-sensitive detector 24, which unbalance will actuate the servomechanism 30 to alter the effective opening of light valve 32 in a direction tending to eliminate the unbalance. The indicator 34 and/or the recorder 36 register the quantitative amount or concentration of the element being analyzed in the sample in response to the effective opening of the light valve 32. From the above, it can be seen that this flame photometer is provided with a stable reference beam 22 to which the variable intensity element beam 18 is constantly referred. Thus, the instrument has a null-balance feature whereby the variable intensity beam 18 is continuously referred to and corrected so as to be balanced with a stable reference beam 22.

Figure 2:
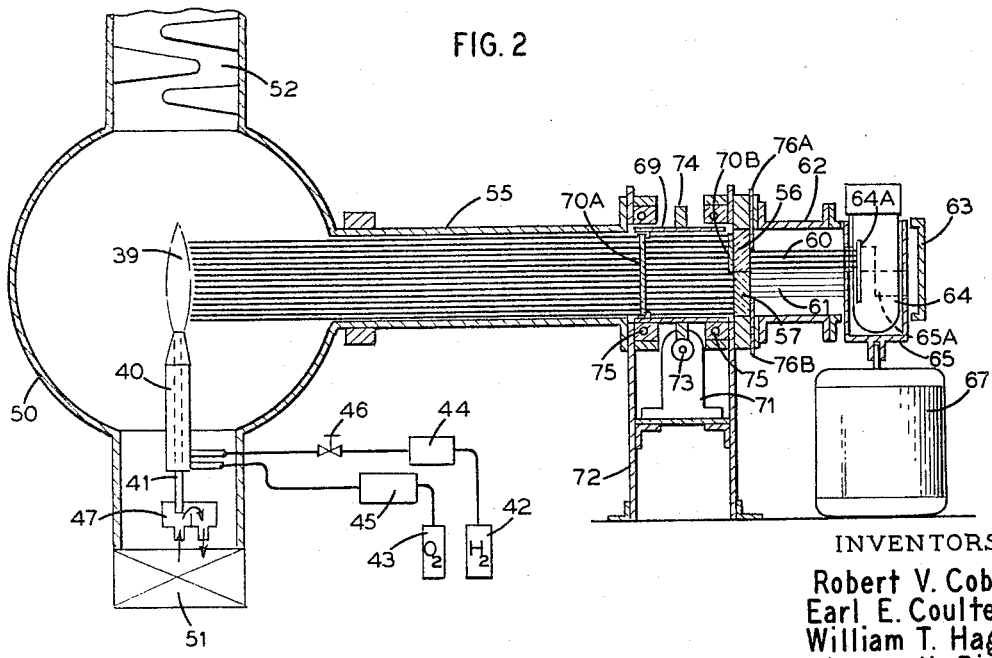
FIG. 2 is a diagrammatic view of one embodiment of the optical system used in the subject invention.

In the embodiment of FIG. 2, the sample to be analyzed is injected into the heat source of flame 39 produced by the hydrogen-oxygen burner 40 through an aspirating tube 41. The hydrogen supply 42 and oxygen supply 43 are respectively fitted with suitable pressure regulators 44 and 45, and the amount of hydrogen passing to the burner 40 may further be suitably controlled by valve 46. The oxygen flow to the burner 40 is not varied during operation, since it is used to aspirate a constant quantity of liquid sample from the continuously overflowing weir box 47 to which the sample is supplied.

The burner 40 is enclosed in a substantially spherical light-tight housing 50 having a highly reflective inner surface to insure maximum utilization of the total flame emission. The spherical shape of the housing 50 concentrates the emissions of the flame 39 so the amount of radiation passing from the flame 39 to the optical system is maximized, thereby improving the sensitivity of the instrument, especially at lower light levels. To prevent the flame 39 from generating false signals due to the inflow of contaminated atmospheric air, the housing 50 is continuously flushed with filtered air supplied from a blower (not shown) to the plenum 51 which opens into the housing 50. A baffled chimney 52 is provided at the top of the housing 50 to prevent outside light from entering the housing and to provide for the escape of the flushing air and the exhaust gases from the flame 39. The light emission or radiation from the flame 39 passes from the housing 50 through the tubular member 55 to the sodium filter 56 and reference filter 57 which are mounted in side-by-side relationship so that separate portions of the total light emitted from the flame 39 pass through each of them. The filters 56 and 57 are of the type commonly known as narrow-band-pass interference filters. Heretofore, it has been common in precision instruments of this character to use prisms and/or gratings to isolate light of a specific wave length; however, these devices were objectionable because they passed only a proportionately small amount of the imposed light and because their relative positioning was so critical as to render them vulnerable to shock and vibration. The interference type filters advantageously are relatively rugged and their absolute positioning is not so critical; moreover, they pass a greater amount of light thereby increasing the sensitivity of the instrument.

The sodium filter 56 is so constructed as to allow only light waves having a wave length of approximately 589 millimicrons (the most intense wave length characteristic of sodium) to pass through it, thereby isolating a beam of light (indicated at 60), the intensity of which is proportional to the amount of sodium in the sample being injected into the flame 39. The reference filter 57 is similarly constructed to isolate a beam of light (indicated at 61) of constant intensity, the wave length of this beam being preferably approximately 570 millimicrons. To arrive at this reference wave length (570), a spectral emission chart was studied, and this wave length selected as being of sufficient purity and free from interference of other elements normally found in samples of the type being analyzed, i.e., steam and relatively high-purity boiler water. Moreover, the optional sensitivity of measurement it is preferable that the the wave length of the reference beam 61 be reasonably close to that of the sodium beam 60 so that the sensing characteristics of the photomultiplier tube 64 need not be excessively broad.

The maximum transmission of light of a specific wave length through narrow-band-pass interference filters (such as filters 56 and 57) and the effective exclusion of all other wave lengths is achieved only if the light incident on the filters is substantially normal to the plane of the filter surface. To insure that the light entering the filters 56 and 57 will have approximately the proper entrance angle and that the light rays at other angles will be absorbed, the tubular member 55 is made approximately five times as long as its diameter, and its inner wall is coated or covered with a light absorbing material. As an alternative, a light collimator (not shown) could be utilized in the instrument between the filters 56 and 57 and the flame 39; thereby eliminating the necessity for the long tubular member 55.

An intermediate rotatable tubular section 69 is aligned with the tubular member 55 upstream of and adjacent the filters 56 and 57. Mounted within the forward end of the tubular section 69 is a sheet of linear polarizing material 70A, through which the total light emission from the flame 39 passes. Another similar sheet of linear polarizing material 70B is fixedly mounted immediately upstream of the sodium filter 56 in a plane parallel to the plane of the sheet 70A, the sheet of polarizing material 70B being so arranged that it affects only that portion of the total emission from flame 39 which is directed to and through the sodium filter 56. When the sheet of polarizing material 70A is rotated so that its transmission axis is parallel to that of the fixed sheet of polarizing material 70B the portions of the total emission passing to the sodium and reference filters 56 and 57 will be relatively unaffected. However, when the sheet 70A is rotated 90° so that its transmission axis is perpendicular to that of the fixed sheet 70B, the beam of light normally incident to the sodium filter 56 will be fully absorbed, while the beam of light normally incident to the reference filter 57 will pass substantially unaffected. Thus, by rotatably positioning the sheet 70A relative to the stationary sheet 70B the intensity of the sodium beam 60 can be selectively attenuated to any desired level without affecting the intensity of the reference beam 61.

Advantageously, in a light valve of the type employing two sheets of polarizing material 70A and 70B, the intensity of the beam passing therethrough varies logarithmically with the relative positions of the transmission axes of the sheets. This characteristic allows the inventive flame photometer to be operable over a wide range (1 to 10,000) of sodium concentrations without the necessity of range-change circuitry or mechanism either in the optical or recording system of the instrument. Moreover, the polaroid type light valve is superior to other known types, such as mechanical shutters or density wedges, in that it effects less of a reduction of the area of light passing through it, and it attenuates the light more evenly over its entire surface.

A short tubular member 62 encloses the two beams 60 and 61 downstream of the filters 56 and 57. Suitably fixed to the outer end of the short tubular member 62 is a cell housing 63 enclosing a light-sensitive cell or photomultiplier tube 64 which is disposed in light receiving relationship to both the sodium beam 60 and the reference beam 61. The photomultiplier tube 64 may be of any suitable type, such as an R.C.A. 1P21, designed for detection and measurement of low light levels.

Photomultiplier tubes adaptable for this type of light detection service normally have imposed on the cathode a direct current (D.C.) voltage. This type of tube is subject to an inherent thermal emission of electrons which generates a small signal known as "dark current," which signal is subject to drift and consequently causes inaccuracy and inconsistency in the tube output, especially at the lower light levels. To avoid this problem in the present invention, the light beams 60 and 61 are chopped at a constant frequency before they are admitted in the cathode 64A of the tube 64. The resultant output signal of the tube 64 then has two components: a D.C. signal representing the "dark current," and an alternating current (A.C.) signal representing the difference between the intensities of the sodium and reference beams 60 and 61. When this combined signal is passed through an A.C. amplifier (see FIG. 1) the D.C. portion of the signal is ignored, thereby eliminating the inherent problems caused by drift of the "dark current" within the photomultiplier tube 64.

The mechanical light interrupter or chopper 65 is a rotatable upright cylindrical member into which the photomultiplier tube 64 is received through an open end. The cylindrical wall of the chopper 65 is formed with four slits or openings 65A spaced such that each of the light beams 60 and 61 is interrupted and admitted into the tube 64 twice during each revolution of the chopper 65. The chopper 65 is rotated about its vertical axis by a synchronous motor 67 designed to operate at the precise speed necessary to produce the desired frequency of the output signal from the photomultiplier tube 64. For example, with the chopper 65 shown, an 1800 r.p.m. synchronous motor 67 would effect an output signal frequency of 60 cycles per second.

As discussed above in relation to FIG. 1, any difference in the intensities of the sodium beam 60 and the reference beam 61 causes an unbalance in the A.C. portion of the output signal from the tube 64, which unbalance energizes a servo-mechanism to alter the effective opening of the light valve in a direction tending to eliminate the difference in beam intensities. The servo-mechanism includes a drive motor (not shown) attached to a gear reducer 71 which is suitably mounted on the stand 72 under the rotatable tube section 69. A worm gear 73 connected to the output shaft of the gear reducer 71 is engaged with an externally toothed gear wheel 74 attached to the outside of the tubular section 69. The tubular section 69 is suitably mounted in a pair of annular precision bearings 75 to facilitate its rotation. Preferably the rotation of the tubular section 69 should be effected at a relatively slow speed to prevent overshooting and consequent "hunting action" on the part of the servo-drive system.

From the foregoing it can be seen that a change in the concentration of sodium in the sample injected into the flame 39 will effect a change in the emission of light having a wave length of 589 millimicrons. Thus, the intensity of the sodium beam 60 will change, while the intensity of the reference beam 61 will remain the same, thereby causing an unbalance in the output signal from the photomultiplier tube 64. This unbalance will cause the servo-drive system to rotate the sheet of polarizing material 70A relative to the stationary sheet of polarizing material 70B so as to change the relative orientation of their transmission axes and thereby change the intensity of the sodium beam 60 so that it is equal to or balanced with that of the reference beam 61.

It should be recognized that once the instrument has been calibrated, the amount of attenuation of the sodium beam 60 required to balance its intensity with the constant intensity reference beam 61 is proportional to the light emissions from the flame 39 attributable to the excitation of the sodium atoms and therefore is quantitatively proportional to the concentration of the sodium in the sample. It should also be recognized that the relative orientation of the transmission axes of the sheets of polarizing material 70A and 70B is proportional to the amount of attenuation of the sodium beam 60. It therefore follows that the position of the rotatable sheet of polarizing material 70A may be used as an indication of the concentration of sodium in the sample. This position can best be monitored through an indicating device (not shown) mechanically or otherwise connected to be operated by the servo-drive system. Additionally or alternatively, a recording device could be similarly connected to the servo-drive mechanism to provide a continuous record of the sodium level in the sample being analyzed.

The intensity of the spectral emission of a dry flame (with no sample introduced) or a flame into which a sodium-free sample is being injected is higher at the 570 millimicron (reference) wave length than at the 589 millimicron (sodium) wave length; therefore, prior to calibration of the instrument an initial intensity balance of the sodium beam 60 and the reference beam 61 must be attained. To effect this initial balance, separately operable mechanical shutters 76A and 76B are respectively located immediately downstream of the filters 56 and 57. Balancing of the beams 60 and 61 is accomplished with the sheets of polarizing material 70A and 70B so oriented that their transmission axes are parallel. Normally, only the reference shutter 76B will need to be closed slightly to balance the beam intensities at the photomultiplier tube 64; however, when high concentrations of sodium are to be analyzed, the sodium shutter 76A may have to be closed slightly.

Following the balancing of the light beams 60 and 61 by use of the shutters 76A and 76B as described above, the instrument may be calibrated by the usual method of injecting samples of known sodium concentration into the flame 39 and adjusting the indictor and/or recorder so that they indicate the proper concentrations. Since the instrument operates on a null-balance principle, i.e., it employs an internal reference (beam 61) to which it constantly refers, and since the usual drift characteristics normally attendant with the use of photomultiplier tubes have been eliminated, after standardization the instrument will operate for long periods without attention and will give accurate and reproducible results.

Figure 3:
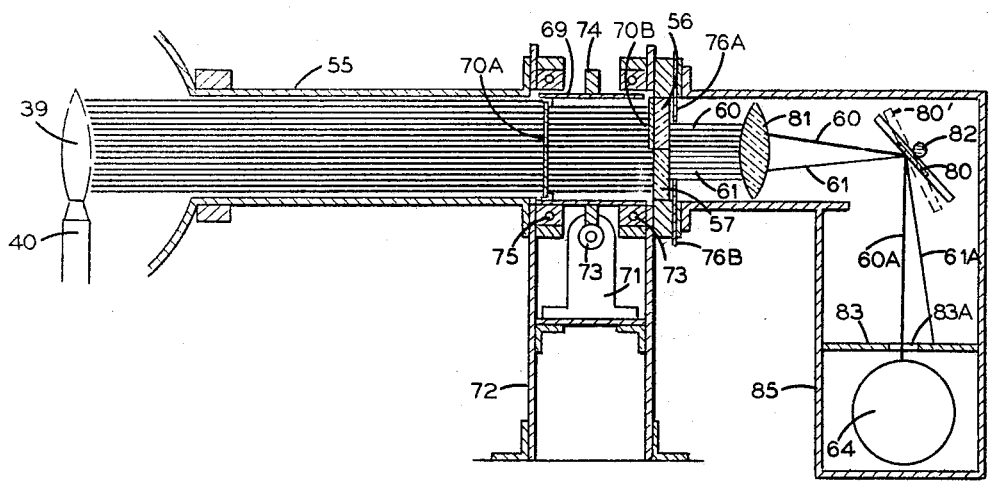
FIG. 3 is a diagrammatic view of an alternative embodiment of a portion of the optical system which may be used in the subject invention.

In the embodiment of FIG. 3, parts similar in structure and function to those shown in FIG. 2 have corresponding reference numerals. This embodiment also utilizes interference filters 56 and 57 to isolate respectively a sodium beam 60 and a reference beam 61 which are alternately admitted into the photomultiplier tube 64. However, in this embodiment, a rotatably vibrating mirror 80 is used to effect the alternate admissions of the beams 60 and 61 into the tube 64. A focusing and concentrating lens 81 is disposed downstream of the filters 56 and 57 for focusing the beams 60 and 61 on the mirror 80. The mirror 80 is mounted on a shaft 82 connected to a suitable drive mechanism (not shown), such as a galvanometer drive, capable of effecting the necessary rotatable vibration, the limits of which are shown by the outlines of mirrors 80 and 80'. The light beams 60A and 61A reflected from the mirror 80 alternately pass through a slit 83A in the plate 83 to the tube 64 which is arranged in light receiving relationship off to one side of the axis of the aligned tubular members 55 and 69. The plate 83 is preferably provided with a light absorbing surface so that the beam not being admitted into the tube 64 (reference beam 61A in FIG. 3) will be absorbed.

The specific embodiments of the present invention have been described above in terms of a flame photometer for determining the concentration of the element sodium in a water sample. However, it should be recognized that this invention may be utilized to determine the concentration of other elements, e.g., copper, iron, etc., simply by inserting the appropriate filter in place of the sodium filter 56. Depending on the intensity of the emission from the flame 39 at the wave length of the element being analyzed, the shutters 76A and 76B may have to be readjusted to initially balance the element beam and the reference beam. If the element being analyzed has a characteristic wave length that is significantly different than the 570 millimicron reference wave length discussed above, it may also be necessary or desirable to change to a different reference wave length in order to stay within the efficient sensing range of the photomultiplier tube 64.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:

1. A method of determining the concentration of an element in a sample comprising the steps of introducing said sample into a heat source capable of ionizing at least some of the atoms of said element to produce light emission from said heat source, isolating from said light emission a first relatively spectrally pure light beam having a wave length characteristic of said element and a second relatively spectrally pure light beam of constant intensity and having a wave length different than any wave length characteristic of said element, and detecting the difference in intensity between said first and second light beams.

2. A method of determining the concentration of an element in a sample comprising the steps of introducing said sample into a heat source capable of ionizing at least some of the atoms of said element to produce light emission from said heat source, isolating from said light emission a first relatively spectrally pure light beam having a wave length characteristic of said element and a second relatively spectrally pure light beam of constant intensity and having a wave length different than any wave length characteristic of said element, detecting the difference in intensity between said first and second light beams, attenuating the intensity of said first light beam so that its intensity is equal to that of said second light beam, and monitoring the degree of attenuation of said first light beam.

3. A method of determining the concentration of an element in a sample comprising the steps of introducing said sample into a heat source capable of ionizing at least some of the atoms of said element to produce light emission from said heat source, isolating from said light emission a first relatively spectrally pure light beam having a wave length characteristic of said element and a second relatively spectrally pure light beam of constant intensity and having a wave length different than any wave length characteristic of said element, detecting the difference in intensity between said first and second light beams, producing an electrical signal having an unbalance representative of said difference, attenuating the intensity of said first light beam in response to the unbalance of said electrical signal to render the intensity of said first light beam equal to that of said second light beam, and monitoring the degree of attenuation of said first light beam.

4. A method of determining the concentration of sodium in a sample comprising the steps of introducing said sample into a heat source capable of ionizing at least some of the sodium atoms in said sample to produce light emission from said heat source, isolating from said light emission a first relatively spectrally pure light beam having a wave length characteristic of sodium and a second relatively spectrally pure light beam of constant intensity and having a wave length close to but different than the wave length characteristic of sodium, detecting the difference in intensity between said first and second light beams, producing an A.C. electrical signal having an unbalance representative of said difference, attenuating the intensity of said first light beam by a light valve having a variable effective opening and operated in response to the unbalance of said electrical signal to render the intensity of said first light beam equal to that of said second light beam, and monitoring the effective opening of said light valve.

5. A device for determining the concentration of an element in a sample comprising a heat source, means for introducing said sample into said heat source, said heat source being of sufficiently high temperature and having sufficient thermal inertia to effect excitation of at least some of the atoms of said element in said sample, whereby light is emitted from said heat source, means for isolating from said light a first relatively spectrally pure light beam having a wave length characteristic of said element and a second relatively spectrally pure constant intensity light beam having a wave length different than any wave length characteristic of said element, the intensity of said first light beam being proportional to the concentration of said element in said sample, and means for detecting the difference in intensity between said first and said second light beams.

6. A device for determining the concentration of an element in a sample comprising a heat source, means for introducing said sample into said heat source, said heat source being of sufficiently high temperature and having sufficient thermal inertia to effect excitation of at least some of the atoms of said element in said sample, whereby light is emitted from said heat source, means for isolating from said light a first relatively spectrally pure light beam having a wave length characteristic of said element and a second relatively spectrally pure constant intensity light beam having a wave length different than any wave length characteristic of said element, the intensity of said first light beam being proportional to the concentration of said element in said sample, means for detecting the difference in intensity between said first and said second light beams, and means for continuously adjusting said first light beam to render its intensity equal with that of said second light beam.

7. A device for determining the concentration of an element in a sample comprising a heat source, means for introducing said sample into said heat source, said heat source being of sufficiently high temperature and having sufficient thermal inertia to effect excitation of at least some of the atoms of said element in said sample, whereby light is emitted from said heat source, a housing defining a substantially spherical chamber in which said heat source is substantially centrally disposed, said housing having a reflective inner surface, first and second filters disposed side-by-side in light receiving relationship to said heat source for respectively isolating from said light a first relatively spectrally pure light beam having a wave length characteristic of said element and a second relatively spectrally pure constant intensity light beam having a wave length different than any wave length characteristic of said element, means disposed between said chamber and said filters for collimating said light, mechanical shutters for separately preadjusting the intensity of said first and said second light beams to effect an initial balance thereof, means for detecting the difference in intensity between said first and said second light beams, and means for continuously adjusting said first light beam to render its intensity equal to that of said second light beam.

8. A device for determining the concentration of an element in a sample comprising a heat source, means for introducing said sample into said heat source, said heat source being of sufficiently high temperature and having sufficient thermal inertia to effect excitation of at least some of the atoms of said element in said sample, whereby light is emitted from said heat source, means for isolating from said light a first relatively spectrally pure light beam having a wave length characteristic of said element and a second relatively spectrally pure constant intensity light beam having a wave length different than any wave length characteristic of said element, the intensity of said first light beam being proportional to the concentration of said element in said sample, means for detecting the difference in intensity between said first and said second light beams and for producing an electrical signal having an unbalance which is representative of said difference, and means for correcting said unbalance comprising a light valve disposed in the path of said first beam and having a variable effective opening for selectively adjusting the intensity of said first light beam, and a drive system connected to said light valve and arranged to vary the effective opening thereof in response to said unbalance to vary the intensity of said first beam in a direction tending to eliminate said unbalance.

9. A device for determining the concentration of an element in a sample comprising a heat source, means for introducing said sample into said heat source, said heat source being of sufficiently high temperature and having sufficient thermal inertia to effect excitation of at least some of the atoms of said element in said sample, whereby light is emitted from said heat source, means for isolating from said light a first relatively spectrally pure light beam having a wave length characteristic of said element and a second relatively spectrally pure constant intensity light beam having a wave length different than said wave length characteristic of said element, a photo-sensitive detector disposed in light receiving relationship to said first and second beams, an interrupter disposed in the paths of said first and second beams for alternately admitting said first and second beams into said detector to produce an output signal therefrom, said signal having an unbalance representative of the difference in intensity between said first and said second beams, and means for correcting said unbalance including a light valve disposed in the path of said first beam and having a variable effective opening for selectively adjusting the intensity of said first light beam, and a servo-system mechanically connected to said light valve and arranged to vary the effective opening thereof in response to said unbalance to vary the intensity of said first beam in a direction tending to eliminate said unbalance.

10. A device for determining the concentration of an element in a sample comprising a heat source, means for introducing said sample into said heat source, said heat source being of sufficiently high temperature and having sufficient thermal inertia to effect excitation of at least some of the atoms of said element in said sample, whereby light is emitted from said heat source, means for isolating from said light a first relatively spectrally pure light beam having a wave length characteristic of said element and a second relatively spectrally pure constant intensity light beam having a wave length different than any wave length characteristic of said element, a photomultiplier tube having a D.C. voltage imposed thereon and disposed in light receiving relationship to said first and second beams, an interrupter disposed in the paths of said first and second beams for alternately admitting said first and second beams into said photomultiplier tube to produce an A.C. output signal therefrom, said signal having an unbalance representative of the difference in intensity between said first and said second beams, and means for correcting said unbalance including an A.C. amplifier connected to said photomultiplier tube, a light valve disposed in the path of said first beam and having a variable effective opening for selectively adjusting the intensity of said first beam, and a servo-drive system mechanically connected to said light valve and electrically connected to said amplifier and arranged to vary the effective opening of said light valve in response to said unbalance to vary the intensity of said first beam in a direction tending to eliminate said unbalance.

11. A device for determining the concentration of an element in a sample comprising a heat source, means for introducing said sample into said heat source, said heat source being of sufficiently high temperature and having sufficient thermal inertia to effect excitation of at least some of the atoms of said element in said sample, whereby light is emitted from said heat source, means for isolating from said light a first relatively spectrally pure light beam having a wave length characteristic of said element and a second relatively spectrally pure constant intensity light beam having a wave length different than any wave length characteristic of said element, a photomultiplier tube having a D.C. voltage imposed thereon and disposed in light receiving relationship to said first and second beams, a mechanical light chopper disposed in the paths of said first and second beams for alternately admitting said first and second beams into said photomultiplier tube to produce an A.C. output signal therefrom, said chopper including a rotatable plate formed with openings therein, and a motor connected to rotate said plate at a predetermined speed proportional to the desired frequency of said signal, said signal having an unbalance representative of the difference in intensity between said first and second beams, and means for correcting said unbalance including an A.C. amplifier connected to said photomultiplier tube, a light valve disposed in the path of said first beam and having a variable effective opening for selectively adjusting the intensity of said first beam, and a servo-drive system mechanically connected to said light valve and electrically connected to said amplifier and arranged to vary the effective opening of said light valve in response to said unbalance to vary the intensity of said first beam in a direction tending to eliminate said unbalance.

12. A device for determining the concentration of an element in a sample comprising a heat source, means for introducing said sample into said heat source, said heat source being of sufficiently high temperature and having sufficient thermal inertia to effect excitation of at least some of the atoms of said element in said sample, whereby light is emitted from said heat source, means for isolating from said light a first relatively spectrally pure light beam having a wave length characteristic of said element and a second relatively spectrally pure constant intensity light beam having a wave length different than any wave length characteristic of said element, a photomultiplier tube having a D.C. voltage imposed thereon and disposed in light receiving relationship to said first and second beams, an interrupter disposed in the paths of said first and second beams for alternately admitting said first and second beams into said photomultiplier tube to produce an A.C. output signal therefrom, said interrupter including a mirror, means for rotationally vibrating said mirror at a predetermined rate proportional to the desired frequency of said signal, and a plate having a slit formed therein and disposed between said mirror and said photomultiplier tube, said signal having an unbalance representative of the difference in intensity between said first and said second beams, and means for correcting said unbalance including an A.C. amplifier connected to said photomultiplier tube, a light valve disposed in the path of said first beam and having a variable effective opening for selectively adjusting the intensity of said first beam, and a servo-drive system mechanically connected to said light valve and electrically connected to said amplifier and arranged to vary the effective opening of said light valve in response to said unbalance to vary the intensity of said first beam in a direction tending to eliminate said unbalance.

13. A device for determining the concentration of an element in a sample comprising a heat source, means for introducing said sample into said heat source, said heat source being of sufficiently high temperature and having sufficient thermal inertia to effect excitation of at least some of the atoms of said element in said sample, whereby light is emitted from said heat source, a first filter for isolating from said light a first relatively spectrally pure light beam having a wave length characteristic of said element, a second filter for isolating from said light a second relatively spectrally pure constant intensity light beam having a wave length different than any wave length characteristic of said element, the intensity of said first light beam being proportional to the concentration of said element in said sample, means for detecting the difference in intensity between said first and said second light beams and for producing an electrical signal having an unbalance representative of said difference, and means for correcting said unbalance comprising a light valve having a variable effective opening for selectively adjusting the intensity of said first light beam, said light valve including a rotatable sheet of polarizing material disposed in the paths of said first and second light beams, a stationary sheet of polarizing material disposed only in the path of said first light beam, and a servo-system mechanically connected to rotate said first sheet of polarizing material to vary the effective opening of said light valve in response to said unbalance, whereby the intensity of said first light beam is altered in a direction tending to eliminate said unbalance.

14. A device for determining the concentration of an element in a sample comprising a heat source, means for introducing said sample into said heat source, said heat source being of sufficiently high temperature and having sufficient thermal inertia to effect excitation of at least some of the atoms of said element in said sample, whereby light is emitted from said heat source, a first filter for isolating from said light a first relatively spectrally pure light beam having a wave length characteristic of said element, a second filter for isolating from said light a second relatively spectrally pure constant intensity light beam having a wave length different than any wave length characteristic of said element, the intensity of said first light beam being proportional to the concentration of said element in said sample, a photomultiplier tube having a D.C. voltage imposed thereon and disposed in light receiving relationship to said first and said second light beams, an interrupter disposed in the paths of said first and second beams for alternately admitting said first and said second beams into said photomultiplier tube to produce an A.C. electrical output signal having an unbalance representative of the difference in intensity between said first and said second beams, and means for correcting said unbalance comprising an A.C. amplifier connected to said photomultiplier tube, a light valve having a variable effective opening for selectively adjusting the intensity of said first light beam, said light valve including a rotatable sheet of polarizing material disposed in the paths of said first and second light beams, and a stationary sheet of polarizing material disposed only in the path of said first light beam, and a servo-drive system mechanically connected to said light valve and electrically connected to said amplifier and arranged to rotate said rotatable sheet of polarizing material relative to said stationary sheet of polarizing material to vary the effective opening of said light valve in response to said unbalance, whereby the intensity of said first beam is altered in a direction tending to eliminate said unbalance, and an indicating device responsive to the amount of effective opening of said light valve for indicating directly the concentration of said element in said sample.

15. A device for determining the concentration of sodium in a sample comprising a heat source, means for introducing said sample into said heat source, said heat source being of sufficiently high temperature and having sufficient thermal inertia to effect excitation of at least some of the sodium atoms in said sample, whereby light is emitted from said heat source, a first narrow band pass interference filter for isolating from said light a first relatively spectrally pure light beam having a wave length of approximately 589 millimicrons, a second narrow band pass interference filter for isolating from said light a second relatvely spectrally pure constant intensity reference light beam having a wave length of approximately 570 millimicrons, the intensity of said first light beam being proportional to the concentration of sodium in said sample, a photomultiplier tube having a D.C. voltage imposed thereon and disposed in light receiving relationship to said first and said second light beams, an interrupter disposed in the paths of said first and second beams for alternately admitting said first and said second beams into said photomultiplier tube to produce an A.C. electrical output signal having an unbalance representative of the difference in intensity between said first and said second beams, and means for correcting said unbalance comprising an A.C. amplifier connected to said photomultiplier tube, a light valve having a variable effective opening for selectively adjusting the intensity of said first light beam, said light valve including a rotatable sheet of polarizing material disposed in the paths of said first and second light beams, and a stationary sheet of polarizing material disposed only in the path of said first light beam, and a servo-drive system mechanically connected to said light valve and electrically connected to said amplifier and arranged to rotate said rotatable sheet of polarizing material relative to said stationary sheet of polarizing material to vary the effective opening of said light valve in response to said unbalance, whereby the intensity of said first beam is altered in a direction tending to eliminate said unbalance, and an indicating device responsive to the amount of effective opening of said light valve for indicating directly the concentration of sodium in said sample.

References Cited

UNITED STATES PATENTS

| | | | |
|---|---|---|---|
| 1,743,792 | 1/1930 | Moeger | 250—225 |
| 2,710,559 | 6/1955 | Heitmiller et al. | 88—14 |
| 3,105,905 | 10/1963 | Loy | 88—14 |

RALPH G. NILSON, *Primary Examiner.*

M. ABRAMSON, *Assistant Examiner.*